US006431353B1

(12) United States Patent
Mizutani

(10) Patent No.: US 6,431,353 B1
(45) Date of Patent: Aug. 13, 2002

(54) DISC CARTRIDGE ENVELOPE

(75) Inventor: Hikaru Mizutani, Minoo (JP)

(73) Assignee: Hitachi Maxell, Ltd., Osaka-fu (JP)

( * ) Notice: Subject to any disclaimer, the term of this patent is extended or adjusted under 35 U.S.C. 154(b) by 0 days.

(21) Appl. No.: 09/589,883

(22) Filed: Jun. 9, 2000

(30) Foreign Application Priority Data

Jun. 9, 1999 (JP) .......................................... 11-162604

(51) Int. Cl.[7] .............................................. B65D 85/57
(52) U.S. Cl. .................................. 206/308.3; 206/308.1
(58) Field of Search .............................. 206/307, 308.1, 206/308.3, 309, 387.1, 387.14, 387.15

(56) References Cited

U.S. PATENT DOCUMENTS

| 3,677,396 A | * | 7/1972 | Staar ...................... 206/387.15 |
| 4,240,551 A | * | 12/1980 | Osanai ................... 206/387.15 |
| 4,413,732 A | * | 11/1983 | Louzil .................... 206/387.1 |
| 5,450,952 A | * | 9/1995 | Funawatari et al. ..... 206/308.3 |
| 5,531,324 A | * | 7/1996 | Kosaki et al. ........... 206/308.1 |
| 5,540,328 A | * | 7/1996 | Kohtake .................. 206/308.1 |
| 5,782,352 A | * | 7/1998 | Senda ..................... 206/308.3 |

FOREIGN PATENT DOCUMENTS

JP        A-10175691        6/1998

* cited by examiner

Primary Examiner—Jim Foster
(74) Attorney, Agent, or Firm—Birch, Stewart, Kolasch & Birch, LLP

(57) ABSTRACT

A cartridge envelope for removably accommodating a disc cartridge includes an envelope structure including top and bottom envelope panels 8 and 9, left and right side walls 10 and 11 and a rear wall 12, all molded together to define a cartridge chamber that opens outwardly in a direction counter to the rear wall through an insertion opening 13. At least one cartridge retaining member 17 including a flexible finger is formed in one of the walls 8 to 12 forming the envelope structure for removably retaining the disc cartridge 1 securely inside the cartridge chamber once the disc cartridge 1 has been inserted thereinto.

6 Claims, 3 Drawing Sheets

DISC CARTRIDGE ENVELOPE

BACKGROUND OF THE INVENTION

1. Field of the Invention

The present invention relates to a cartridge envelope for removably accommodating a disc cartridge.

2. Description of the Prior Art

As is well known to those skilled in the art, some types of optical discs such as, for example, magnetooptical discs are operatively accommodated within a disc cartridge of a generally rectangular flattened configuration. Not only to protect the disc cartridge from dusts, but also to provide the disc cartridge with an aesthetically appealing feature in the market, the disc cartridge containing the respective optical disc is placed on the market in the form as accommodated within a protective or storage envelope. This type of cartridge envelope for a standardized size of the disc cartridge is known from, for example, the Japanese Laid-open Patent Publication No. 10-175691, published Jun. 30, 1998 and assigned to the assignee of the present invention.

According to the above mentioned publication, the cartridge envelope is generally made up of four separate component parts including a generally rectangular flat casing, a pivotally supported panel and a pair of lock elements. The casing includes top and bottom envelope panels each having left and right side walls and a rear wall. While the rear wall of the top envelope panel is segmented into two, the top envelope panel is mounted on the bottom envelope panel for sliding motion in a direction parallel to the bottom envelope panel and conforming to the direction of insertion of the disc cartridge into the cartridge envelope and also for pivotal motion between closed and opened positions relative to the bottom envelope panel. The top envelope panel when in the closed position overlays the bottom envelope panel to define a cartridge chamber therebetween with the side walls of the top envelope panel positioned inwardly of the adjacent side walls of the bottom envelope panel.

A cartridge retaining member, which in the above mentioned publication is termed a "lock body" and which is a member separate from any one of the top and bottom envelope panels, is mounted on each of the segmented rear wall portions in a snap-fitted fashion. The cartridge retaining member includes a base body and an elongated elastic element having its opposite ends integral with the base body, a generally intermediate portion of which extends outwardly from the base body to depict a generally C-shaped configuration to thereby define an elastic protrusion. Within this prior art cartridge envelope, the elastic protrusions of the respective cartridge retaining members on the segmented rear wall portions protrude inwardly relative to each other and into the cartridge chamber so that, as the disc cartridge is inserted into the cartridge chamber, the elastic protrusions can be inwardly deformed in sliding contact with the respective side walls of the disc cartridge and finally snapped into associated positioning recesses in the disc cartridge that are disposed inside the disc player for engagement therewith to retain the disc cartridge in position inside the disc player. With the elastic protrusions engaged in the associated positioning recesses in the disc cartridge, the latter can be securely retained in position inside the cartridge chamber of the cartridge envelope.

In practice, however, the cartridge retaining members disclosed in the above mentioned publication are not only complicated in shape, but time-consuming and expensive to mount the cartridge retaining members on the segmented wall portions of the top envelope panel which are also complicated in shape and structure. Also, manufacture of the prior art cartridge retaining members requires the use of a complicated and expensive mold assembly. Consequently, the prior art cartridge envelope is expensive to manufacture.

The above mentioned publication also discloses, as prior art to the invention thereof, a cartridge envelope generally similar to that described above, except that the top envelope panel is fixed relative to the bottom envelope panel. Specifically, this cartridge envelope comprises top and bottom envelope halves that are joined together to define the cartridge chamber therein. A cartridge retaining member generally similar in shape to that described above is fixedly mounted on each of opposite side walls of the cartridge envelope and functions in a manner similar to that described. Since this cartridge retaining member is a member separate from any of the top and bottom envelope halves, the use of a complicated mold assembly is necessitated and the cartridge retaining member itself is complicated in shape, resulting in increase of the cost of manufacture of the cartridge envelope as a whole.

SUMMARY OF THE INVENTION

Accordingly, the present invention has been devised to substantially eliminate the above discussed problems and disadvantages inherent in the prior art cartridge envelope and is intended to provide an improved cartridge envelope having a capability of securely retaining the disc cartridge once it has been inserted into the cartridge envelope, which envelope can be manufactured in the form of a unitary structure to thereby reduce the cost of manufacture thereof.

Another important object of the present invention is to provide an improved cartridge envelope wherein at least one cartridge retaining member is formed integrally with a wall portion of the envelope structure to thereby simplify the structure of the cartridge envelope.

In order to accomplish these and other objects of the present invention, there is provided a cartridge envelope for removably accommodating a disc cartridge, which includes an envelope structure including top and bottom envelope panels, left and right side walls and a rear wall, all molded together to define a cartridge chamber that opens outwardly in a direction counter to the rear wall through an insertion opening. At least one cartridge retaining member formed in one of the walls forming the envelope structure for removably retaining the disc cartridge securely inside the cartridge chamber once the disc cartridge has been inserted thereinto.

Preferably, the cartridge retaining member is of one-piece structure including a flexible finger and a retaining protuberance formed on the flexible finger so as to protrude inwardly of the cartridge chamber. The retaining protuberance is engageable with an outer surface of the disc cartridge, inserted into the cartridge chamber, to retain the disc cartridge securely inside the cartridge chamber.

One of the positioning recesses disposed generally in the disc cartridge for cooperation with corresponding positioning pins disposed inside the disc player to retain the disc cartridge in position inside the disc player relative to an optical read/write head may be utilized for receiving the retaining protuberance to thereby securely retain the disc cartridge inside the cartridge chamber of the cartridge envelope.

In one preferred embodiment of the present invention, the flexible finger may be supported in a cantilever fashion and the retaining protuberance is formed on a free end of the flexible finger.

In another preferred embodiment of the present invention, the opposite side walls of the envelope structure may have a wall thickness greater than that of the top and bottom panels thereof and each of the opposite side walls may have an inner surface formed with a generally U-sectioned trim groove at a position intermediate of the thickness thereof so as to extend lengthwise of the associated side wall from a front end thereof adjacent the insertion opening to a location spaced a distance inwardly from the rear wall.

In any event, at least one of the opposite side walls of the envelope structure preferably has a portion thereof recessed inwardly to provide a thin-walled portion, and the cartridge retaining member is to be formed in that thin-walled portion with the flexible finger displaceable within the recess so formed in the side wall.

BRIEF DESCRIPTION OF THE DRAWINGS

The present invention will become readily understood from the following description of preferred embodiments thereof made with reference to the accompanying drawings, in which like parts are designated by like reference numeral and in which.

DESCRIPTION OF THE EMBODIMENTS

Figure 1:
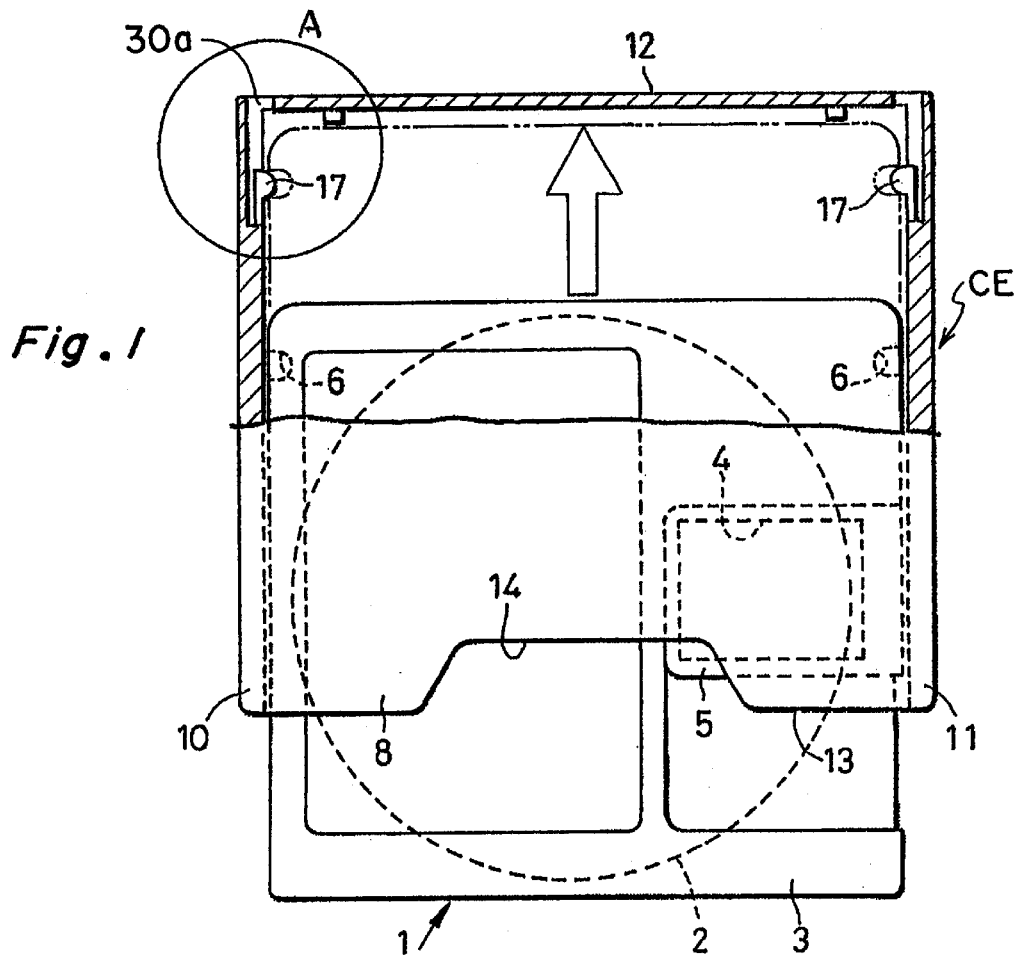
FIG. 1 is a schematic top plan view, with a portion cut out, of a cartridge envelope according to a first preferred embodiment of the present invention, shown together with a disc cartridge inserted generally halfway in the cartridge envelope.
Figure 2:
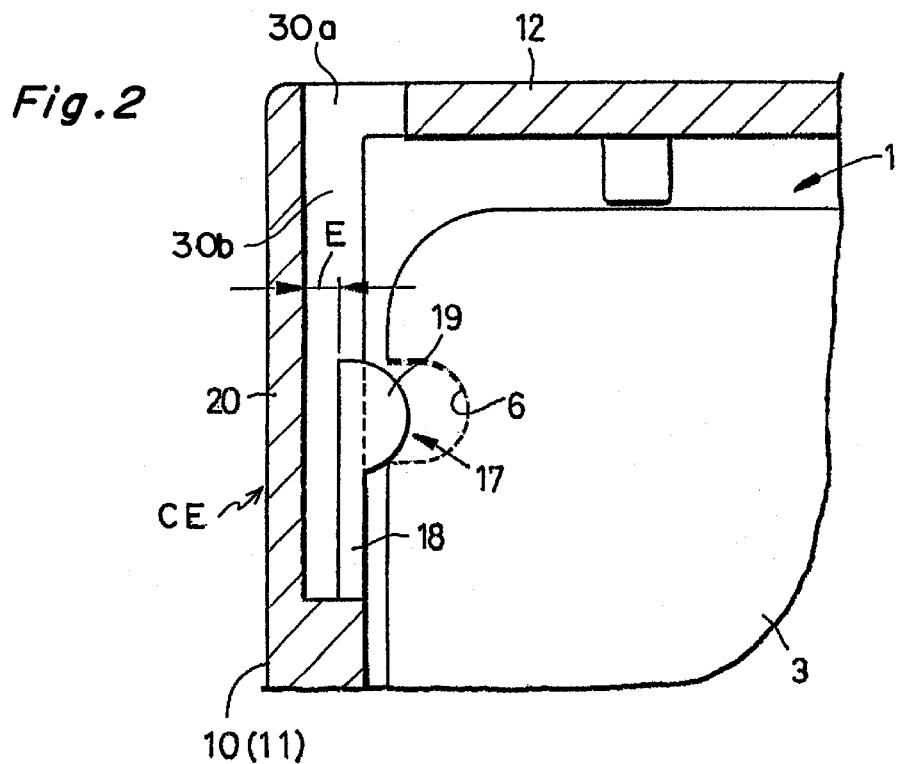
FIG. 2 is a sectional view, on an enlarged scale, of a portion of the cartridge envelope that is encompassed within the circle A shown in FIG. 1, showing one of retainer protuberances in the cartridge envelope engaged in a corresponding positioning recess in the disc cartridge.
Figure 3:
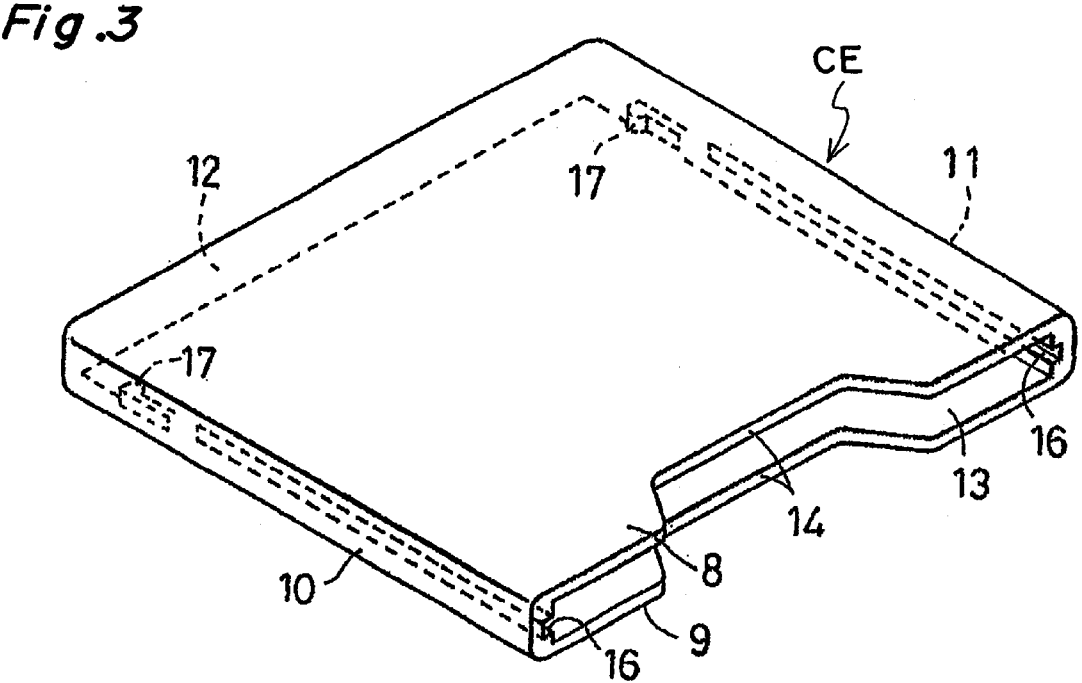
FIG. 3 is a schematic perspective view of the cartridge envelope.
Figure 4:
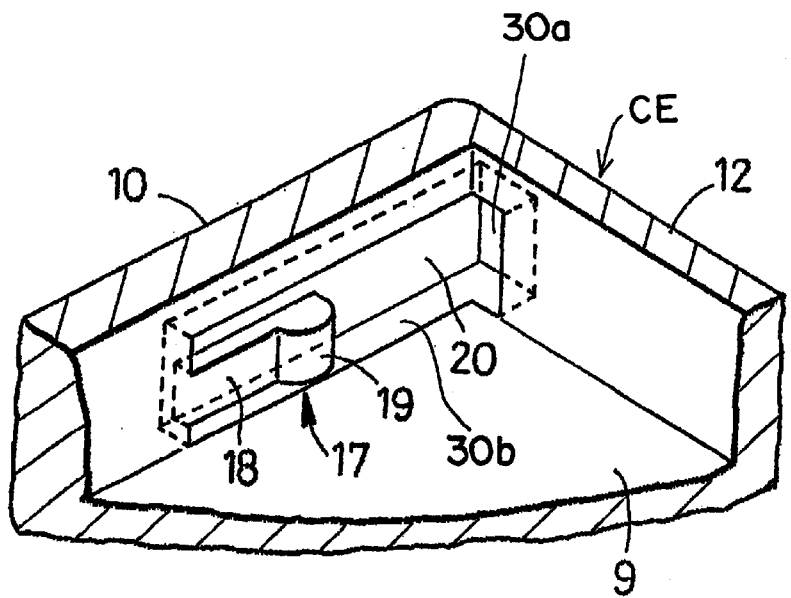
FIG. 4 is a fragmentary perspective view, shown in section, of one of four corner regions of the cartridge envelope showing the details of the corresponding retainer protuberance.

Referring first to FIGS. 1 and 2, a cartridge envelope shown therein is intended to accommodate therein an optical disc cartridge 1 of a standardized size such as, for example, a commercially available "Mini Disc Cartridge". As is well known to those skilled in the art, the optical disc cartridge 1 is of a generally rectangular shape and includes a cartridge casing 3 in which, for example, a rewritable magneto-optical disc 2 is rotatably accommodated therein. The cartridge casing 3 is made up of top and bottom cartridge panels and four side walls, all assembled together to define a disc chamber inside the cartridge casing 3, and includes a slide shutter 5. The slide shutter 5 is normally biased to a closing position to close an access window 4 that is defined in at least one of the top and bottom cartridge panels, but can be moved to an open position as the disc cartridge 1 is inserted into a disc player (not shown) to allow an optical head of the player to make access therethrough to the optical disc 2.

Also as is well known to those skilled in the art, in order for the optical disc cartridge 1, inserted into the disc player, to be retained in position inside the disc player, the disc cartridge 1 has a pair of positioning recesses 6 defined in left and right side portions, as viewed in FIG. 1, of the cartridge casing 3 so as to open in two directions perpendicular to each other, that is, downwardly and laterally outwardly thereof, at respective locations adjacent a front end of the disc cartridge 1 with respect to the arrow-headed direction of insertion of the optical disc cartridge 1 into the disc player. More specifically, each positioning recess 6 is defined in part in the bottom cartridge panel and in part in the adjacent side wall of the cartridge casing 3. The positioning recesses 6 in the disc cartridge 1 are cooperable with corresponding positioning pins disposed inside the disc player that may be moved to engage in the positioning recesses 6 to retain the disc cartridge 1 in position inside the disc player.

Since the disc cartridge 1 of the structure outlined above is generally standardized and is placed on the market and does not therefore pertain to the subject matter of the present invention, the details thereof will not be reiterated for the sake of brevity. It is, however, to be noted that the present invention makes use of the positioning recesses 6 to allow the standardized disc cartridge 1 to be securely retained inside a cartridge envelope, as will be described later, once the disc cartridge 1 is inserted into the cartridge envelope for storage purpose during nonuse of the disc cartridge 1 in relation to the disc player.

Referring now to FIGS. 1 to 4, the cartridge envelope generally identified by CE may be of one-piece structure made of a plastics such as, for example, polypropylene and includes top and bottom envelope panels 8 and 9, left and right side walls 10 and 11 and a rear wall 12, all molded together to define a cartridge chamber that opens outwardly in a direction counter to the rear wall 12 through an insertion opening 13. The cartridge chamber defined in the cartridge envelope CE is so slightly oversized relative to the size of the disc cartridge 1 that the disc cartridge 1 can be sheltered within the cartridge envelope CE without giving rise to an excessive rattling motion inside the cartridge envelope CE. To enable user's fingers to make access to the disc cartridge 1 within the cartridge envelope CE when the disc cartridge 1 is desired to be removed from the cartridge envelope CE, respective front edge portions of the top and bottom panels 8 and 9 remote from the rear wall 12 are inwardly recessed at a position generally intermediate of the width thereof to define associated cutouts 14.

To minimize the amount of plastics used to mold the cartridge envelope CE and, on the other hand, to secure a required strength of the cartridge envelope CE, the top and bottom panels 8 and 9 may have a relatively small wall thickness while at least the left and right side walls 10 and 11 are formed as a principal load bearing wall. More specifically each of the left and right side walls 10 and 11 is formed to have a thickness greater than that of the top and bottom panels 8 and 9 so that the left and right side walls 10 and 11 can withstand an external force that may be applied to or act on the cartridge envelope CE. However, to reduce the volume of each of the left and right side walls 10 and 11, each side wall 10 or 11 have an inner surface formed with a respective trimmed groove 16 positioned intermediate of the thickness thereof so as to lengthwise of the associated side wall 10 or 11 from a front end thereof adjacent the insertion opening 13 to a location spaced a distance inwardly from the rear wall 12, as best shown by the phantom line in FIG. 3.

The cartridge envelope CE embodying the present invention also includes left and right cartridge retaining members 17 that are formed integrally therewith and cooperable with the positioning recesses 6 in the disc cartridge 1 to retain the latter securely inside the cartridge envelope CE once the disc cartridge 1 has been inserted thereinto. These left and right cartridge retaining members 17 are disposed in the left and right side walls 10 and 11, respectively, and positioned within the cartridge chamber in a cantilever fashion at respective locations inwardly adjacent the rear wall 12.

Hereinafter, since the left and right cartridge retaining members 17 are of an identical structure, reference will be made only to the left cartridge retaining member 17 in describing the details thereof. The cartridge retaining member 17 includes a flexible finger 18 having a front end formed integrally with the corresponding side wall 10 or 11 so as to extend rearwardly in a cantilever fashion. An opposite, rear end of the flexible finger 18 is formed integrally with a retaining protuberance 19 so as to protrude a distance into the cartridge chamber inside the cartridge envelope CE. The retaining protuberance 19 is of a generally semi-cylindrical cross-section with its longitudinal axis oriented transverse to the lengthwise direction of the respective side wall 10 or 11 and has a size sufficient to snugly engage in the associated positioning recess 6 in the disc cartridge 1.

To accommodate the cartridge retaining member 17 in the manner described above, the rear end portion of the corresponding side wall 10 or 11 is inwardly recessed so as to open inwardly of the cartridge chamber while leaving rear and bottom openings 30a and 30b that are communicated to the outside of the cartridge envelope CE in respective directions perpendicular to each other. Formation of the inward recess in the rear end portion of the side wall 10 or 11 leaves a thin-walled portion 20 and the respective cartridge retaining member 17 with the flexible finger 18 spaced a distance from an inner surface of the thin-walled portion 20. This can be accomplished by forcibly removing a shaping mold element so as to leave the corresponding cartridge retaining member 17 during the molding of the cartridge envelope CE. The spacing, indicated by E in FIG. 2, between the inner surface of the thin-walled portion 20 and a surface of the cartridge retaining member 17 confronting the thin-walled portion 20 can be formed, with no undercut formed, in complemental shape to the corresponding shape of the shaping mold element that has been withdrawn through the rear and bottom openings 30a and 30b. It is, however, to be noted that the spacing E is of a size sufficient to accommodate a deformation of the cartridge retaining member 17 against its own elasticity to such an extent as to allow a tip of the retaining protuberance 19 to lie in flush with the inner surface of the corresponding side wall 10 or 11.

The cartridge envelope CE of the structure described above operates in the following manner. Assuming that the disc cartridge 1 is inserted into the cartridge envelope CE with the positioning recesses 17 oriented towards the rear wall 12, front corners of the cartridge envelope CE adjacent the positioning recesses 6 slide over the retaining protuberances 19 to cause the respective retaining members 17 to deform against their own elasticity in a direction away from each other. Continued insertion of the disc cartridge 1 results in the retaining protuberances 19 sliding along respective outer surfaces of the opposite side walls of the disc cartridge 1. Simultaneously with arrival of the disc cartridge 1 at a completely inserted position substantially as shown in FIG. 2, the retaining protuberances 19 are snapped into the associated positioning recesses 6 by the effect of the elasticity of the cartridge retaining members 17. Once the retaining protuberances 19 are engaged in the respective positioning recesses 6 in the manner described above, the disc cartridge 1 is securely retained in the form as inserted into the cartridge envelope CE. It is to be noted that snapping of the retaining protuberances 19 into the positioning recesses 6 generates a sharp sound that provides an audible indication of complete insertion of the disc cartridge 1 into the cartridge envelope CE.

When the disc cartridge 1 retained inside the cartridge envelope CE is desired to be removed out of the cartridge envelope CE, the user has to grip a portion of the disc cartridge 1 that is exposed to the outside through the cutouts 14 in the cartridge envelope CE and then to pull the disc cartridge 1 outwardly relative to the cartridge envelope CE. At this time the cartridge retaining members 17 operate in a manner substantially reverse to that during insertion of the disc cartridge 1 into the cartridge envelope CE.

In the foregoing embodiment of the present invention, the two cartridge retaining members 17 have been shown and described as disposed in the left and right side walls 10 and 11 of the cartridge envelope CE so as to cooperate with the positioning recesses 6 in the standardized disc cartridge 1. However, the number of the cartridge retaining members 17 may not be always limited to two such as shown, but the use of the single cartridge retaining member 17 may suffice if so desired.

Figure 5:
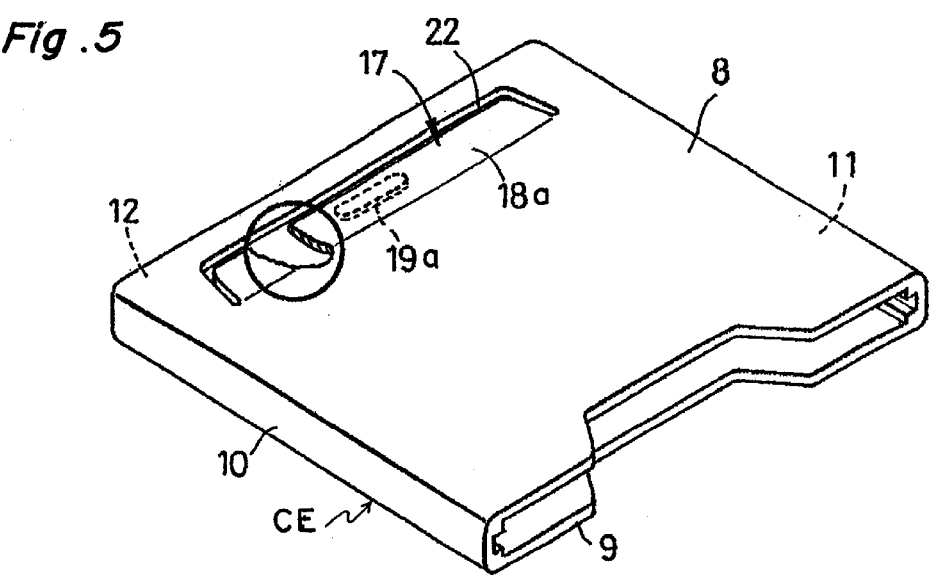
FIG. 5 is a schematic perspective view of the cartridge envelope according to a second preferred embodiment of the present invention.
Figure 6:
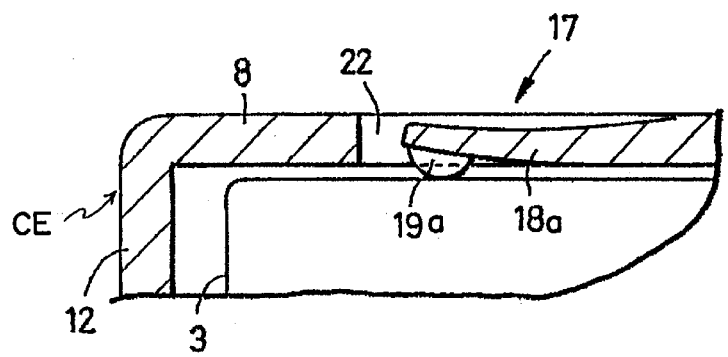
FIG. 6 is a fragmentary sectional view, on an enlarged scale, showing a portion of the cartridge envelope of FIG. 5 where a cartridge retaining member cooperable with the positioning recess in the disc cartridge is disposed.

In another embodiment of the present invention shown in FIGS. 5 and 6, the single cartridge retaining member 17 is disposed in one of the top and bottom envelope panels, for example, the top envelope panel 8. The cartridge retaining member 17 shown in FIGS. 5 and 6 includes a flexible flap 18a left by formation of a generally U-shaped slit 22 in the top envelope panel 8 at a location adjacent to and generally along the rear edge of the top envelope panel 8 with its opposite end portions extending a distance forwardly away from the rear wall 12. The flexible flat 18a has a retaining protuberance 19b of a generally elongated configuration formed integrally therewith and positioned adjacent a free edge portion of the flap 18a so as to protrude inwardly of the cartridge chamber.

According to the embodiment shown in FIGS. 5 and 6, as best shown in FIG. 6, when the disc cartridge 1 is inserted within the cartridge envelope CE, the retaining protuberance 19b is elastically engaged with the top cartridge panel of the disc cartridge 1 to thereby securely retain the disc cartridge 1 inside the cartridge envelope CE to such an extent that the disc cartridge 1 inside the cartridge envelope CE will not fall by its own weight.

It is to be noted that the flexible flap 18a has a wall thickness progressively decreasing towards the free edge thereof adjacent the rear wall 12 as clearly shown in FIG. 6 so that the free edge of the flexible flap 18a will not protrude outwardly from an outer surface of the top envelope panel 8 when and so long as the disc cartridge 1 is inside the cartridge envelope CE.

Figure 7:
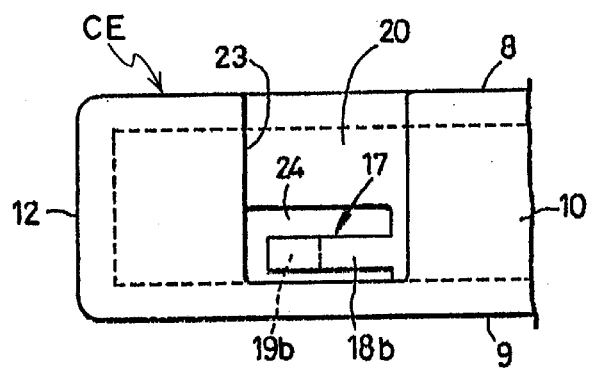
FIGS. 7 and 8 are fragmentary side views showing a portion of the cartridge envelope according to third and fourth preferred embodiments of the present invention, respectively.

In a further embodiment of the present invention as shown in FIG. 7, the cartridge retaining member 17 is formed by a portion of at least one of the left and right side walls, for example, the left side wall 10. The cartridge retaining member 17 shown therein includes a flexible finger 18b that is formed by depleting that portion of the left side wall 10 in a generally U-shaped configuration as at 24 so as to allow the resultant flexible finger 18b to extend in a direction lengthwise of the left side wall 10. As is the case with the flexible finger employed in the embodiment shown in FIGS.

1 to 4, the flexible finger 18b has its free end formed with a retaining protuberance 19b engageable in the corresponding positioning recess 6 in the disc cartridge 1.

Preferably, in order for the flexible finger 18b to have a required flexibility, an outer surface of that portion of the left side wall 10 where the flexible finger 18b is to be formed is inwardly recessed to leave the thin-walled portion 20, so that the flexible finger 18b can have a wall thickness substantially equal to that of the thin-walled portion 20.

Figure 8:
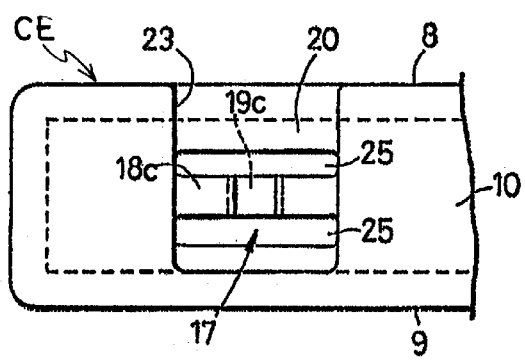

In a different embodiment of the present invention shown in FIG. 8, the cartridge retaining member 17 comprises a flexible finger 18c formed in the left side wall 10 in a manner generally similar to that shown in FIG. 7. Specifically, the inner surface of that portion of the left side wall 10 where the flexible finger 18c is to be formed is inwardly recessed to leave the thin-walled portion 20, and grooves 25 extending parallel to each other in a direction lengthwise of the left side wall 10 are formed in that thin-walled portion 20 so as to leave the flexible finger 18c. Thus, it will readily be seen that the flexible finger 18c has its opposite ends integral with the left side wall 10, and a retaining protuberance 19c engageable in the corresponding positioning recess 6 in the disc cartridge 1 is formed integrally with a substantially intermediate portion of the flexible finger 18c so as to protrude inwardly of the cartridge chamber of the cartridge envelope CE.

Although the present invention has been described in connection with the preferred embodiments thereof with reference to the accompanying drawings, it is to be noted that various changes and modifications are apparent to those skilled in the art. By way of example, although in any one of the foregoing embodiments except for that shown in FIGS. 5 and 6 one or both of the left and right side walls 10 and 11 of the cartridge envelope CE has been shown and described as formed with the thin-walled portion 20 where the cartridge retaining member 17 is situated, they may not have the thin-walled portion formed therein. Accordingly, such changes and modifications are to be understood as included within the scope of the present invention as defined by the appended claims, unless they depart therefrom.

What is claimed is:

1. A cartridge envelope for removably accommodating a disc cartridge, which comprises:

an envelope structure including top and bottom envelope panels, left and right side walls and a rear wall, all molded together to define a cartridge chamber that opens outwardly in a direction counter to the rear wall through an insertion opening; and at least one cartridge retaining member formed in one of the walls forming the envelope structure for removably retaining the disc cartridge securely inside the cartridge chamber once the disc cartridge has been inserted thereinto, and the disc cartridge has a recess defined in an outer surface of the disc cartridge and wherein the cartridge retaining member comprises a flexible finger and a retaining protuberance formed on the flexible finger so as to protrude inwardly of the cartridge chamber, said retaining protuberance being engageable in the recess in the disc cartridge, inserted into the cartridge chamber, to retain the disc cartridge securely inside the cartridge chamber, wherein at least one of the opposite side walls of the envelope structure has a portion thereof recessed inwardly to provide a thin-walled portion, said cartridge retaining member being formed in that thin-walled portion with the flexible finger displaceable within the recess so-formed in the side wall.

2. The cartridge envelope as claimed in claim 1, wherein the cartridge retaining member comprises a flexible finger and a retaining protuberance formed on the flexible finger so as to protrude inwardly of the cartridge chamber, said retaining protuberance being engageable with an outer surface of the disc cartridge, inserted into the cartridge chamber, to retain the disc cartridge securely inside the cartridge chamber.

3. The cartridge envelope as claimed in claim 1, wherein the flexible finger is supported in a cantilever fashion and the retaining protuberance is formed on a free end of the flexible finger.

4. A cartridge envelope for removably accommodating a disc cartridge, which comprises:

an envelope structure including top and bottom envelope panels, left and right side walls and a rear wall, all molded together to define a cartridge chamber that opens outwardly in a direction counter to the rear wall through an insertion opening; and at least one cartridge retaining member formed in one of the walls forming the envelope structure for removably retaining the disc cartridge securely inside the cartridge chamber once the disc cartridge has been inserted thereinto, wherein the opposite side walls of the envelope structure has a wall thickness greater than that of the top and bottom panels thereof and each of the opposite side walls has an inner surface formed with a generally U-sectioned trim groove at a position intermediate of the thickness thereof so as to extend lengthwise of the associated side wall from a front end thereof adjacent the insertion opening to a location spaced a distance inwardly from the rear wall.

5. The cartridge envelope as claimed in claim 4, wherein the cartridge retaining member comprises a flexible finger and a retaining protuberance formed on the flexible finger so as to protrude inwardly of the cartridge chamber, said retaining protuberance being engageable with an outer surface of the disc cartridge, inserted into the cartridge chamber, to retain the disc cartridge securely inside the cartridge chamber.

6. The cartridge envelope as claimed in claim 4, wherein the disc cartridge has a recess defined in an outer surface of the disc cartridge and wherein the cartridge retaining member comprises a flexible finger and a retaining protuberance formed on the flexible finger so as to protrude inwardly of the cartridge chamber, said retaining protuberance being engageable in the recess in the disc cartridge, inserted into the cartridge chamber, to retain the disc cartridge securely inside the cartridge chamber.

* * * * *